July 12, 1932.  F. H. DELLAREE  1,866,880
PICK-UP DEVICE FOR SCREWS AND THE LIKE
Original Filed Jan. 9, 1926
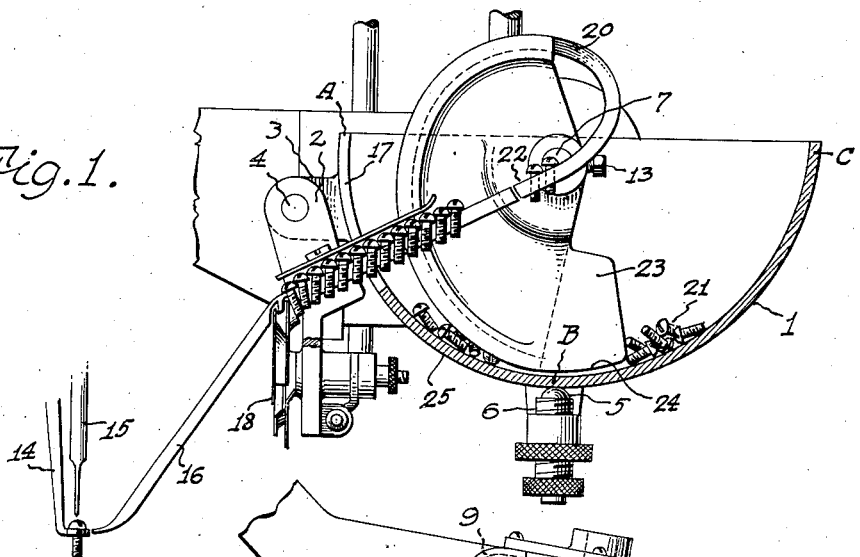
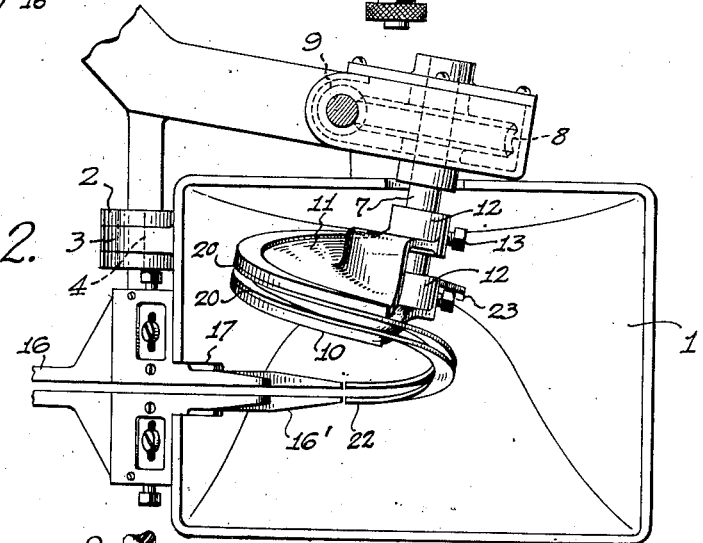
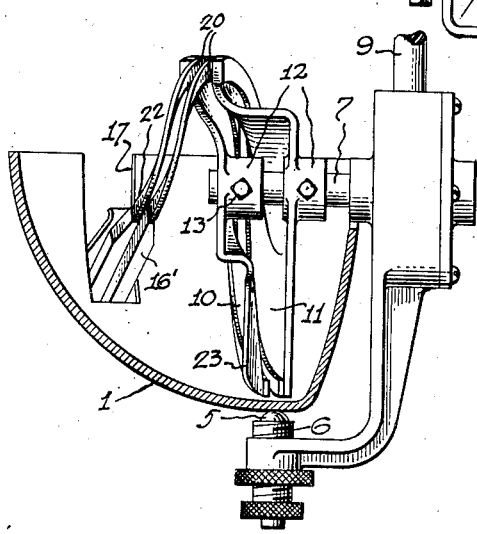
INVENTOR
Frank H. Dellaree,
BY
ATTORNEYS

Patented July 12, 1932

1,866,880

UNITED STATES PATENT OFFICE

FRANK H. DELLAREE, OF DETROIT, MICHIGAN

PICK-UP DEVICE FOR SCREWS AND THE LIKE

Original application filed January 9, 1926, Serial No. 80,184. Patent No. 1,813,697. Divided and this application filed July 7, 1930. Serial No. 466,127.

The present invention pertains to a novel pick-up device for screws and other headed members similar to that disclosed in my copending application, Serial No. 80,184, filed January 9, 1926, of which this application is a division.

The object of the invention is to provide a device of this character adapted to gather a quantity of screws from a hopper in a disorderly or intermingled condition and to deliver them in an aligned condition to a track or chute from which they are passed to a power screw driver. Although devices having these general functions are known, the present invention aims to provide such a device capable of high speed operation and such regularity of performance as to avoid interruption of the high speed screw driving machine associated with the device.

Generally, the device of the invention comprises a pair of spaced plates rotating with a common shaft in a fixed hopper. The outer edges of the plates form a track in the nature of a scroll or non-planar spiral gradually increasing in radius in the direction of rotation or from the trailing to the leading end thereof. At the leading end, the plates are sufficiently spaced to receive a quantity of screws in an intermingled or disorderly condition, but the width of the track is adjusted to admit the shanks of the screws and to retard the heads thereof. The screws collected between the plates eventually gravitate to the track in the position described and are finally delivered from the trailing end of the track to a fixed delivery track or chute by means of which they are directed to the power screw driver.

The invention is fully disclosed by way of example in the following description and in the accompanying drawing in which—

Figure 1 is a vertical section of the device, partly in section;

Fig. 2 is a plan view thereof; and

Fig. 3 is a vertical section at right angles to Fig. 1.

Reference to these views will now be had by use of like characters which are employed to designate corresponding parts throughout.

In the several views is illustrated a hopper or magazine 1 supported in any suitable manner from a fixed part 2 of the frame of the machine. Preferably, the hopper has an external lug 3 attached to the member 2 by a pivot pin 4 and has its bottom resting on a ball 5 resiliently supported in a stud 6 which in turn is adjustably mounted in the frame of the machine as described in the parent application.

In the frame of the machine is journaled a shaft 7 lying preferably in a horizontal plane but at an angle to the axis of the hopper for a purpose which will presently be described. The shaft carries a worm gear 8 meshing with a worm 9 driven in any suitable manner.

On the shaft is mounted a pick-up device consisting essentially of two similar plates 10 and 11 having hub members 12 fastened on the shaft by set screws 13. The plates are constructed, as will presently appear, to pick up a mass of screws in a disorderly condition at one end and to discharge them in an aligned and orderly condition at the other end.

At an external point with respect to the hopper is mounted a screw receiving member 14 adapted to hold a screw in position to be engaged by a mechanically operated screw driver 15 and thus driven into the work as also fully described in the parent application. A chute or track 16 extends from the holder into the hopper 1 through a slot 17 in the latter and slopes downwardly towards the holder 14 from the end disposed within the hopper. The discharge end of the pick-up device communicates at intervals with the latter end of the chute as will presently appear. An escapement device generally indicated by the numeral 18 affects a timed delivery of the screws to the holder 14.

As previously stated, the pick-up device is designed to receive screws at one end and deliver them from the other end to the receiving end 16' of the track 16. Consequently, the plates must be of gradually diminishing radius from the leading end to the trailing end thereof. Due to this progressive radius, it is necessary to provide that the receiving end 16', after registering with the part having substantially the minimum radius, shall not be struck by a part having a greater radius, during the rotation of the device. Consequently, the outer edge of each plate should follow a curve that does not lie entirely in one plane, in order that the receiving end 16' will be cleared without being struck, by the edges of the plates 10 and 11 having slightly greater than minimum radius. A further requirement is that the spacing of the plates at the outer edges thereof shall remain uniform along these edges when the spacing at the hubs is varied for different diameters of screws.

The maximum and minimum radii of the plates and the position of the track 16 are given or predetermined, and the curve is to pass through approximately 360°. The other characteristics of the curve must be developed in conformity with this data and the previously mentioned requirements.

To fulfill these requirements, the plates 10 and 11 are of gradually increasing radius from the shaft 7 as a center, approaching a maximum radius nearly equal to the minimum radius of the hopper 1 from the same center. The edge of each plate forms a spiral, in the sense that a spiral is a curve winding about a point while receding therefrom; but inasmuch as a spiral is generally understood to lie in a single plane, the edges of the plates may be defined as non-planar spirals. Stated differently, the edge of each plate resembles a helix, except for the fact that a helix is generally generated on a cylinder, while in the present instance the curve is similarly generated on the surface of a cone and may therefore be identified as a coniform helix. The terms used in describing the plates and the edges thereof hereinafter are to be construed in view of these definitions. The curve has a constant pitch angle and a varying linear pitch.

To the curved edges of the plates and at the inner faces thereof are secured rails 20 to define a track towards which the screws 21 in the hopper gravitate during the rotation of the pick-up device with the end of larger radius as the leading end. The plates are adjusted to receive the shanks of the screws and prevent the heads thereof from passing between the rails 20. At the trailing end, the rails 20 may be continued beyond the plates to complete the curve through approximately 360°, inasmuch as the screw-confining action of the plates is no longer necessary at this point. From the end of the curve, the rails are extended in a straight line, as indicated by the numeral 22, to align with the track 16. This extension of the track lies at an acute angle to the shaft 7 in conformity with the constant pitch angle of the spiral, in order to permit a smooth and unretarded flow of screws from the curve to the rectilinear extension 22. In mounting the device so that the extension 22 will align with the track 16 as in Fig. 2, it becomes necessary to mount the shaft 7 at an angle to the track 16 as also illustrated in Fig. 2.

The plates 10 and 11 are preferably spaced farther apart at the leading edges than at the trailing edges, as may be seen in Fig. 3, in order to facilitate entrance of the screws into the space between the plates. To improve this action still further, a wing 23 is formed at the leading edge of the plate 10 and directed angularly outwardly therefrom or away from the plate 11 as shown in Fig. 3. The base edge 24 of the wing is preferably an arc having the maximum radius of the plate 10. It is also preferred that the plates converge from the center towards the curved edges thereof to assist in the singling out of the screws as they approach the rails 20.

The curved bottom 25 of the hopper 1 is of constant radius from the point A to the point of support B, this radius being slightly greater than the maximum radius of the plates 10 and 11 as already stated. From the point B to the point C the radius of the bottom gradually increases.

Thus, the space between the bottom and the rails 20, between the points A and B, gradually increases as the pick-up device advances, as a result of which there is no crushing of the screws accumulating in this space. As the intake end of the device passes the point D, the pick-up is in close proximity to the bottom and thus gathers a number of screws. As the device advances from the point D to the point C, the space between the device and the bottom of the hopper increases, so that the device is not overloaded and screws are not swept out of the hopper.

The screws which have been gathered in the pick-up device gravitate towards the rails 20 in the rotation of the device and eventually take a position wherein the shanks are disposed between the rails and the heads rest upon the rails. When the extension 22 registers with the end 16' of the track 16, these screws are delivered to the track, and thence to the holder 14 under the control of the escapement device 16.

Although a specific embodiment of the invention has been illustrated and described, it will be apparent that various alterations in the details of construction may be made without departing from the scope of the invention as indicated by the appended claims.

What I claim is:—

1. In a screw handling machine, a magazine, a shaft rotatable in said magazine, a pair of non-planar plates mounted on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, and screw receiving means with which the trailing end of said slot is adapted to register.

2. In a screw handling machine, a magazine, a shaft rotatable in said magazine, a pair of non-planar plates mounted on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, the inner faces of said plates converging towards said slot and screw receiving means with which the trailing end of said slot is adapted to register.

3. In a screw handling machine, a magazine, a shaft rotatable in said magazine, a pair of non-planar plates mounted on said shaft and having their peripheries formed and spaced to provide a slot of generally decreasing radius from the leading end to the trailing end thereof, said plates being spaced at their respective leading edges and radially inward of said slot sufficiently to admit a quantity of screws in a disorderly condition, and screw receiving means with which the trailing end of said slot is adapted to register.

4. In a screw handling machine, a magazine, a shaft rotatable in said magazine, a pair of non-planar plates mounted on said shaft and having their peripheries formed and spaced to provide a slot of generally decreasing radius from the leading end to the trailing end thereof, the ends of said slot being spaced apart in a direction substantially parallel to said shaft, said plates being spaced at their respective leading edges and radially inward of said slot sufficiently to admit a quantity of screws in a disorderly condition, and screw receiving means with which the trailing end of said slot is adapted to register.

5. In a screw handling machine, a magazine, a shaft rotatable in said magazine, a pair of non-planar plates longitudinally adjustable on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, and screw receiving means with which the trailing end of said slot is adapted to register.

6. In a screw handling machine, a magazine, a shaft rotatable in said magazine, a pair of non-planar plates mounted on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, in combination with a fixed delivery track, the trailing end of said slot being adapted to communicate with said track.

7. A screw gathering instrumentality comprising a shaft, a pair of non-planar plates mounted on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, and screw receiving means with which the trailing end of said slot is adapted to register.

8. A screw gathering instrumentality comprising a shaft, a pair of non-planar plates mounted on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, the inner faces of said plates converging towards said slot and screw receiving means with which the trailing end of said slot is adapted to register.

9. A screw gathering instrumentality comprising a shaft, a pair of non-planar plates mounted on said shaft and having their peripheries formed and spaced to provide a slot of generally decreasing radius from the leading end to the trailing end thereof, said plates being spaced at their respective leading edges and radially inward of said slot sufficiently to admit a quantity of screws in a disorderly condition, the inner faces of said plates converging towards said slot, and screw receiving means with which the trailing end of said slot is adapted to register.

10. A screw gathering instrumentality comprising a shaft, a pair of non-planar plates mounted on said shaft and having their peripheries formed and spaced to provide a slot of generally decreasing radius from the leading end to the trailing end thereof, the ends of said slot being spaced apart along said shaft, said plates being spaced at their respective leading edges and radially inward of said slot sufficiently to admit a quantity of screws in a disorderly condition, the inner faces of said plates converging towards said slot, and screw receiving means with which the trailing end of said slot is adapted to register.

11. A screw gathering instrumentality comprising a shaft, a pair of non-planar plates longitudinally adjustable on said shaft and having their peripheries formed and spaced to provide a slot of generally decreasing radius from the leading end to the trailing end thereof, the ends of said slot being spaced apart in a direction substantially parallel to said shaft, said plates being spaced at their respective leading edges and radially inward of said slot sufficiently to admit a quantity of screws in a disorderly condition, the inner faces of said plates converging towards said slot, and screw receiving means with which the trailing end of said slot is adapted to register.

12. A screw gathering instrumentality comprising a shaft, a pair of non-planar plates mounted on said shaft and having their peripheries formed and spaced to provide a slot of such width as to admit the shank of a screw but arrest the head thereof, said slot following a non-planar spiral path, said plates being spaced at their respective leading edges and radially inward of said slot sufficiently to admit a quantity of screws in a disorderly condition, and screw receiving means with which the trailing end of said slot is adapted to register.

13. A screw gathering instrumentality comprising a shaft, a pair of non-planar plates mounted on said shaft and having their peripheries formed and spaced to provide a slot of such width as to admit the shank of a screw but arrest the head thereof, said slot following a non-planar spiral path, said plates being spaced at the ends of larger radius sufficiently to admit a quantity of screws in a disorderly condition, and a track extending from the other end of said slot in prolongation thereof and having a rectilinear free end portion, and screw receiving means with which the trailing end of said slot is adapted to register.

14. A screw gathering instrumentality comprising a shaft, a pair of plates mounted on said shaft and having their peripheries formed and spaced to provide a slot of such width as to admit the shank of a screw but arrest the head thereof, said slot following a non-planar spiral path, said plates being spaced at the ends of larger radius sufficiently to admit a quantity of screws in a disorderly condition, and a track extending from the other end of said slot in prolongation thereof at the pitch angle of said slot and having a rectilinear free end portion, and screw receiving means with which the trailing end of said slot is adapted to register.

15. A screw gathering instrumentality comprising a shaft, a pair of plates mounted on said shaft and having their peripheries formed and spaced to provide a slot of such width as to admit the shank of a screw but arrest the head thereof, said slot following a non-planar spiral path, said plates being spaced at the ends of larger radius sufficiently to admit a quantity of screws in a disorderly condition, a track extending from the other end of said slot in prolongation thereof and having a rectilinear free end portion, and a delivery track with which said extension is adapted to register.

16. A screw gathering instrumentality comprising a shaft, a pair of non-planar plates mounted on said shaft and having their peripheries formed and spaced to provide a slot of such width as to admit the shank of a screw but arrest the head thereof, said plates being spaced at their respective leading edges and radially inward of said slot sufficiently to admit a quantity of screws in a disorderly condition, and an outwardly directed wing at the leading edge of one of said plates, and screw receiving means with which the trailing end of said slot is adapted to register.

17. A screw gathering instrumentality comprising a shaft, a pair of non-planar plates mounted on said shaft and having their peripheries formed and spaced to provide a slot of such width as to admit the shank of a screw but arrest the head thereof, said slot following a non-planar spiral path, said plates being spaced at their respective leading edges and radially inward of said slot sufficiently to admit a quantity of screws in a disorderly condition, in combination with a curved hopper in which said plates are adapted to rotate, said bottom having a portion of slightly greater radius than the maximum radius of said plates and concentric therewith, the remainder of said bottom being of gradually increasing radius from the first named portion and in the direction of rotation of said plates, and screw receiving means with which the trailing end of said slot is adapted to register.

In testimony whereof I affix my signature.

FRANK H. DELLAREE.